US010043052B2

(12) United States Patent
Wickboldt et al.

(10) Patent No.: US 10,043,052 B2
(45) Date of Patent: Aug. 7, 2018

(54) ELECTRONIC DEVICE PACKAGES AND METHODS

(71) Applicant: Synaptics Incorporated, San Jose, CA (US)

(72) Inventors: Paul Wickboldt, Walnut Creek, CA (US); Khamvong Thammasouk, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 1011 days.

(21) Appl. No.: 13/657,959

(22) Filed: Oct. 23, 2012

(65) Prior Publication Data

US 2013/0108124 A1    May 2, 2013

Related U.S. Application Data

(60) Provisional application No. 61/552,108, filed on Oct. 27, 2011.

(51) Int. Cl.
*G06K 9/00* (2006.01)

(52) U.S. Cl.
CPC ..... *G06K 9/00053* (2013.01); *Y10T 29/49117* (2015.01)

(58) Field of Classification Search
None
See application file for complete search history.

(56) References Cited

U.S. PATENT DOCUMENTS

| 4,151,512 | A | 4/1979 | Riganati et al. |
| 4,225,850 | A | 9/1980 | Chang et al. |
| 4,310,827 | A | 1/1982 | Asai |
| 4,353,056 | A | 10/1982 | Tsikos |
| 4,405,829 | A | 9/1983 | Rivest et al. |
| 4,525,859 | A | 6/1985 | Bowles et al. |
| 4,550,221 | A | 10/1985 | Mabusth |
| 4,580,790 | A | 4/1986 | Doose |
| 4,758,622 | A | 7/1988 | Gosselin |
| 4,817,183 | A | 3/1989 | Sparrow |
| 5,076,566 | A | 12/1991 | Kriegel |
| 5,109,427 | A | 4/1992 | Yang |
| 5,140,642 | A | 8/1992 | Hau et al. |

(Continued)

FOREIGN PATENT DOCUMENTS

| DE | 2213813 A1 | 10/1973 |
| EP | 0929028 A2 | 1/1998 |

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Randolph I Chu
(74) *Attorney, Agent, or Firm* — Leydig, Voit & Mayer, Ltd.

(57) ABSTRACT

Electronic devices are described which are adapted and configured to incorporate a fingerprint sensor within a recess or aperture, formed or molded in the housing, such that the fingerprint sensor interface is within 500 microns of an exterior surface of the device. Methods of use and manufacture are also described.

28 Claims, 7 Drawing Sheets

(56) References Cited

U.S. PATENT DOCUMENTS

| | | |
|---|---|---|
| 5,305,017 A | 4/1994 | Gerpheide |
| 5,319,323 A | 6/1994 | Fong |
| 5,325,442 A | 6/1994 | Knapp |
| 5,420,936 A | 5/1995 | Fitzpatrick et al. |
| 5,422,807 A | 6/1995 | Mitra et al. |
| 5,456,256 A | 10/1995 | Schneider et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor |
| 5,848,176 A | 12/1998 | Hara et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,999,637 A | 12/1999 | Toyoda et al. |
| 6,002,815 A | 12/1999 | Immega et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Sartor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,317,508 B1 | 11/2001 | Kramer et al. |
| 6,320,394 B1 | 11/2001 | Tartagni |
| 6,332,193 B1 | 12/2001 | Glass et al. |
| 6,333,989 B1 | 12/2001 | Borza |
| 6,337,919 B1 | 1/2002 | Duton |
| 6,346,739 B1 | 2/2002 | Lepert et al. |
| 6,347,040 B1 | 2/2002 | Fries et al. |
| 6,362,633 B1 | 3/2002 | Tartagni |
| 6,360,004 B1 | 5/2002 | Akizuki |
| 6,392,636 B1 | 5/2002 | Ferrari et al. |
| 6,399,994 B2 | 6/2002 | Shobu |
| 6,400,836 B2 | 6/2002 | Senior |
| 6,401,551 B1 | 6/2002 | Seiko |
| 6,408,087 B1 | 6/2002 | Kramer |
| 6,473,072 B1 | 10/2002 | Comiskey et al. |
| 6,509,501 B2 | 1/2003 | Eicken et al. |
| 6,539,101 B1 | 3/2003 | Black |
| 6,580,816 B2 | 6/2003 | Kramer et al. |
| 6,597,289 B2 | 7/2003 | Sabatini |
| 6,643,389 B1 | 11/2003 | Raynal et al. |
| 6,672,174 B2 | 1/2004 | Deconde et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,838,905 B1 | 1/2005 | Doyle |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,035,443 B2 | 4/2006 | Wong |
| 7,042,535 B2 | 5/2006 | Katoh et al. |
| 7,043,061 B2 | 5/2006 | Wong |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,843,438 B2 | 11/2010 | Onoda |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,077,935 B2 | 12/2011 | Geoffroy et al. |
| 8,601,876 B2 * | 12/2013 | Schneider ............ A61B 5/1172 382/124 |
| 9,453,822 B2 * | 9/2016 | Schneider ............ A61B 5/1172 |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |

(56) References Cited

U.S. PATENT DOCUMENTS

| | | |
|---|---|---|
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0163601 A1* | 11/2002 | Min .................. G02F 1/13338 349/33 |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fuji |
| 2003/0161512 A1 | 8/2003 | Mathiassen |
| 2003/0169228 A1 | 9/2003 | Mathiassen et al. |
| 2003/0174256 A1 | 9/2003 | Kim et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0110103 A1 | 5/2005 | Setlak |
| 2005/0111708 A1 | 5/2005 | Chou |
| 2005/0109835 A1 | 6/2005 | Jacoby et al. |
| 2005/0123176 A1 | 6/2005 | Ishii et al. |
| 2005/0136200 A1 | 6/2005 | Durell et al. |
| 2005/0139656 A1 | 6/2005 | Arnouse |
| 2005/0162402 A1 | 7/2005 | Watanachote |
| 2005/0169503 A1 | 8/2005 | Howell et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0119698 A1* | 5/2007 | Day .................. G06F 3/038 200/510 |
| 2007/0138299 A1 | 6/2007 | Mitra |
| 2007/0180261 A1 | 8/2007 | Akkermans et al. |
| 2007/0198141 A1 | 8/2007 | Moore |
| 2007/0198435 A1 | 8/2007 | Siegal |
| 2007/0228154 A1 | 10/2007 | Tran |
| 2007/0237366 A1 | 10/2007 | Maletsky |
| 2007/0248249 A1 | 10/2007 | Stoianov |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 5/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Newton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0002867 A1 | 10/2008 | Mathiassen et al. |
| 2008/0240523 A1 | 10/2008 | Benkley et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2009/0080738 A1* | 3/2009 | Zur .................. A61B 8/4254 382/131 |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169063 A1* | 7/2009 | Kuraishi .............. A61B 5/1172 382/116 |
| 2009/0169071 A1 | 7/2009 | Bond et al. |
| 2009/0174974 A1 | 7/2009 | Huang et al. |
| 2009/0237135 A1 | 9/2009 | Ramaraju et al. |

(56) References Cited

U.S. PATENT DOCUMENTS

| | | |
|---|---|---|
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0097080 A1* | 4/2010 | Kobayashi ......... G06K 9/00053 324/692 |
| 2010/0119124 A1 | 5/2010 | Satyan |
| 2010/0123657 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0238119 A1* | 9/2010 | Dubrovsky ........... G06F 1/1626 345/169 |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0102567 A1* | 5/2011 | Erhart ................ G06K 9/00053 348/77 |
| 2011/0102569 A1 | 5/2011 | Erhart |
| 2011/0182486 A1 | 7/2011 | Valfridsson et al. |
| 2011/0214924 A1 | 9/2011 | Pererselsky et al. |
| 2011/0254108 A1* | 10/2011 | Gozzini ............. G06K 9/00053 257/415 |
| 2011/0267298 A1* | 11/2011 | Erhart .................. G06F 1/1626 345/173 |
| 2011/0298711 A1 | 12/2011 | Dean et al. |
| 2011/0304001 A1* | 12/2011 | Erhart ................ G06K 9/00053 257/433 |
| 2012/0092350 A1* | 4/2012 | Ganapathi .......... G02B 26/0833 345/501 |
| 2012/0105081 A1* | 5/2012 | Shaikh ................. G06K 9/0002 324/686 |
| 2012/0134549 A1* | 5/2012 | Benkley, III ........... G01N 27/04 382/124 |
| 2012/0242610 A1* | 9/2012 | Yasumatsu ............. G06F 3/045 345/173 |
| 2012/0242635 A1* | 9/2012 | Erhart ................... G06F 1/1626 345/207 |
| 2012/0258773 A1* | 10/2012 | Alvarez Rivera .... G06F 1/1656 455/556.1 |
| 2013/0194071 A1* | 8/2013 | Slogedal .......... G06K 19/07701 340/5.82 |
| 2015/0178548 A1* | 6/2015 | Abdallah ................ G06F 21/32 382/124 |
| 2015/0254826 A1* | 9/2015 | Kanda ................... G06T 7/0012 382/128 |
| 2015/0332483 A1* | 11/2015 | Siddiqi ................. G06T 17/30 382/131 |

FOREIGN PATENT DOCUMENTS

| | | | |
|---|---|---|---|
| EP | 0905646 | A1 | 3/1999 |
| EP | 0973123 | A1 | 1/2000 |
| EP | 1018697 | A2 | 7/2000 |
| EP | 1139301 | A2 | 10/2001 |
| EP | 1531419 | A2 | 5/2005 |
| EP | 1533759 | A1 | 5/2005 |
| EP | 1538548 | A2 | 6/2005 |
| EP | 1624399 | B1 | 2/2006 |
| EP | 1939788 | A1 | 7/2008 |
| GB | 2331613 | A | 5/1999 |
| GB | 2480919 | | 12/2011 |
| GB | 2490593 | A | 11/2012 |
| JP | 04158434 | A2 | 6/1992 |
| JP | 2005242856 | | 9/2005 |
| TW | 200919255 | A | 5/2009 |
| WO | WO 1990/03620 | A1 | 4/1990 |
| WO | WO 1998/58342 | A1 | 12/1998 |
| WO | WO 1999/028701 | A1 | 6/1999 |
| WO | WO 1999/043258 | A1 | 9/1999 |
| WO | WO 2001/022349 | A1 | 3/2001 |
| WO | WO 2001/094902 | A2 | 12/2001 |
| WO | WO 2001/094902 | A3 | 12/2001 |
| WO | WO 2001/095304 | A1 | 12/2001 |
| WO | WO 2002/011066 | A1 | 2/2002 |
| WO | WO 2002/047018 | A2 | 6/2002 |
| WO | WO 2002/047018 | A3 | 6/2002 |
| WO | WO 2002/61668 | A1 | 8/2002 |
| WO | WO 2002/077907 | A1 | 10/2002 |
| WO | WO 2002/093239 | A1 | 11/2002 |
| WO | WO 2002/099520 | A1 | 12/2002 |
| WO | WO 2003/063054 | A2 | 7/2003 |
| WO | WO 2003/075210 | A2 | 9/2003 |
| WO | WO 2004/066194 | A1 | 8/2004 |
| WO | WO 2004/066693 | A1 | 8/2004 |
| WO | WO 2005/0104012 | A1 | 11/2005 |
| WO | WO 2005/106774 | A2 | 11/2005 |
| WO | WO 2005/106774 | A3 | 11/2005 |
| WO | WO 2006/040724 | | 4/2006 |
| WO | WO 2006/041780 | A1 | 4/2006 |
| WO | WO 2007/011607 | A1 | 1/2007 |
| WO | WO 2008/033264 | A2 | 3/2008 |
| WO | WO 2008/033264 | A3 | 3/2008 |
| WO | WO 2008/033265 | A2 | 6/2008 |
| WO | WO 2008/033265 | A3 | 6/2008 |
| WO | WO 2008/137287 | A1 | 11/2008 |
| WO | WO 2009/002599 | A2 | 12/2008 |
| WO | WO 2009/002599 | A3 | 12/2008 |
| WO | WO 2009/029257 | A1 | 6/2009 |
| WO | WO 2009/079219 | A1 | 6/2009 |
| WO | WO 2009/079221 | A2 | 6/2009 |
| WO | WO 2009/079257 | A1 | 6/2009 |
| WO | WO 2009/079262 | A1 | 6/2009 |
| WO | WO 2010/034036 | A1 | 3/2010 |
| WO | WO 2010/036445 | A1 | 4/2010 |
| WO | WO 2010/143597 | A1 | 12/2010 |
| WO | WO 2011/053797 | A1 | 5/2011 |

OTHER PUBLICATIONS

Maltoni, "Handbook of Fingerprint Recognition", XP002355942 Springer, New York, USA, Jun. 2003 (Jun. 2003) pp. 65-69.
Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.
Ratha, et al. "Adaptive Flow Orientation Based Feature Extraction in Fingerprint Images," Pattern Recognition, vol. 28 No. 11, 1657-1672, Nov. 1995.
Ratha, et al., "A Real Time Matching System for Large Fingerprint Databases," IEEE, Aug. 1996.
Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.
Rivest, et al., "A Method for Obtaining Digital Signatures and Public-Key Cryptosystems", Communication of the ACM, vol. 21 (2), pp. 120-126. (1978).
Hiltgen, et al., "Secure Internet Banking Authentication", IEEE Security and Privacy, IEEE Computer Society, New York, NY, US, Mar. 1, 2006 (Mar. 1, 2006), pp. 24-31, XP007908655, ISSN: 1540-7993.
Hegt, "Analysis of Current and Future Phishing Attacks on Internet Banking Services", Mater Thesis. Techische Universiteit Eindhoven—Department of Mathematics and Computer Science May 31, 2008 (May 31, 2008), pp. 1-149, XP002630374, Retrieved (56) References Cited

OTHER PUBLICATIONS from the Internet: URL:http://alexandria.tue.nl/extral/afstversl/wsk-i/hgt2008.pdf [retrieved on Mar. 29, 2011] pp. 127-134, paragraph 6.2.
Gassend, et al., "Controlled Physical Random Functions", In Proceedings of the 18th Annual Computer Security Conference, Las Vegas, Nevada, Dec. 12, 2002.
Bellagiodesigns.com (Internet Archive Wayback Machine, www.bellagiodesigns.com date: Oct. 29, 2005).
Taiwan Patent Office Search Report; Taiwan Application No. 101139655; dated May 25, 2016.

\* cited by examiner

ELECTRONIC DEVICE PACKAGES AND METHODS

CROSS-REFERENCE

This application claims the benefit of U.S. Provisional Application No. 61/552,108, filed Oct. 27, 2011, which application is incorporated herein by reference.

BACKGROUND OF THE INVENTION

Since its inception, fingerprint sensing technology has revolutionized biometric identification and authentication processes. In most cases, a single fingerprint can be used to uniquely identify an individual in a manner that cannot be easily replicated or imitated. The ability to capture and store fingerprint image data in a digital file of minimal size has yielded immense benefits in fields such as law enforcement, forensics, and information security.

However, the widespread adoption of fingerprint sensing technology in a broad range of applications has faced a number of obstacles. Among these obstacles is the need for a separate and distinct apparatus for capturing a fingerprint image. Additionally, such components are often impractical for use in systems that are designed to be of minimal size or weight or which have minimal physical control elements such as buttons or other surface protrusions or which have a molded lens or cover.

A moldable touch screen and/or display or device case or housing adapted to provide sensing or imaging capability, such as fingerprint imaging or stylus sensing, location sensing, movement speed sensing, would thus lead to increased adoption of fingerprint-based authentication and would be desirable. Most fingerprint sensors require a silicon circuit on which to mount the fingerprint sensing components. Incorporating such a circuit, whether resistive, capacitive, thermal, or optical, into a device surface can require significant and costly modifications to the design and production processes of such surfaces.

As will be seen, the present disclosure provides such a system that overcomes these obstacles.

SUMMARY OF THE INVENTION

An aspect of the disclosure is directed to an electronic device comprising a component which has a sensor, such as a capacitive image sensor, inserted near or at the surface on which sensing can be performed. Another aspect of the disclosure is directed to a moldable touch screen and/or display or device case or housing adapted to provide sensing capability, such as fingerprint or stylus sensing, location sensing, movement speed sensing.

An aspect of the disclosure is directed to an electronic device housing. Suitable electronic device housings comprise: an upper surface, a lower surface and side surfaces between the upper surface and the lower surface such that the upper, lower and side surfaces integrally form the electronic device housing and define a cavity within the housing and an exterior surface of the housing; and a fingerprint sensor region integrally formed within the housing, wherein the fingerprint sensor region comprises at least one of a recess, alcove, depression, aperture, gap, opening and space within an opening facing an interior of the housing, wherein the recess is sized to receive a fingerprint sensor therein, and further wherein a sensing portion of the fingerprint sensor is positionable within the fingerprint sensor region at a location within 500 microns of an exterior surface of the housing at the fingerprint sensor region and an integrated circuit positionable within the housing in communication with the fingerprint sensor. Additionally, electronic devices are configurable to have a display screen interface, such as a display screen interface that forms all or a portion of one of the surfaces of the housing, comprises a touch screen sensor, presents a visual display, is incorporated into the display screen interface, and/or also comprises a cover lens. Electronic device housings are also configurable to provide one or more button interfaces adapted and configured to operate the electronic device. In some configurations, a support material is positionable within the recess of the fingerprint sensor region formed within the housing and may provide mechanical support to the sensor. The housing can further be configured to comprise a bezel, such as where the housing has a display screen interface and the display screen interface is positioned such that the bezel surrounds the exterior edge of the interface and secures the interface within the remainder of the device housing. In some configurations, additional tactile mechanical features can be provided on the external surface of the housing at an external position of the device housing where the fingerprint sensing elements are located within the housing. Suitable tactile mechanical features include, but are not limited to, concave or convex exterior features. The electronic device housing can be formed such that the fingerprint sensor region is molded therein. In at least some configurations, the integrated circuit that controls the operation of the fingerprint sensor is positioned within the at least one of a recess, alcove, depression, aperture, gap, opening and space accessible from an interior surface of the housing. Alternatively, the integrated circuit that controls the operation of the fingerprint sensor is positioned within housing generally, but not within the recess.

Another aspect of the disclosure is directed to methods of using an electronic devices having an upper surface, a lower surface and side surfaces between the upper surface and the lower surface such that the upper, lower and side surfaces integrally form the electronic device housing and define a cavity within the housing and an exterior surface of the housing; and a fingerprint sensor region integrally formed within the housing, wherein the fingerprint sensor region comprises at least one of a recess, alcove, depression, aperture, gap, opening and space within an opening facing an interior of the housing, wherein the recess is sized to receive a fingerprint sensor therein, and further wherein a sensing portion of the fingerprint sensor is positionable within the fingerprint sensor region at a location within 500 microns of an exterior surface of the housing at the fingerprint sensor region and an integrated circuit positionable within the housing in communication with the fingerprint sensor. Suitable methods include: at least one of placing or swiping a finger of a user on an exterior surface of the electronic device housing proximate the fingerprint sensor positioned within the housing; obtaining fingerprint information from the finger; validating the fingerprint information obtained; and at least one of enabling and disabling functionality of the electronic device in response to the step of validating. In some implementations, fingerprint information obtained is one of 1D and 2D fingerprint information; the step of validating further comprises at least one of successfully validating the fingerprint information, and failing to successfully validate the fingerprint information; the step of enabling functionality further comprises enabling one or more of unlocking a user interface, accessing an internet connection, accessing one or more electronic files, accessing one or more resident applications, accessing a camera, accessing an electronic accessory, and accessing an email account; and/or the step of disabling functionality further comprises disabling one or more of unlocking a user interface, accessing an internet connection, accessing one or more electronic files, accessing one or more resident applications, accessing a camera, accessing an electronic accessory, and accessing an email account.

Other aspects of the disclosure are directed to methods of manufacturing or fabricating an electronic device having a housing with an upper surface, a lower surface and side surfaces between the upper surface and the lower surface such that the upper, lower and side surfaces integrally form the electronic device housing and define a cavity within the housing and an exterior surface of the housing; and a fingerprint sensor region integrally formed within the housing, wherein the fingerprint sensor region comprises at least one of a recess, alcove, depression, aperture, gap, opening and space within an opening facing an interior of the housing, wherein the recess is sized to receive a fingerprint sensor therein, and further wherein a sensing portion of the fingerprint sensor is positionable within the fingerprint sensor region at a location within 500 microns of an exterior surface of the housing at the fingerprint sensor region and an integrated circuit positionable within the housing in communication with the fingerprint sensor. Methods of manufacture include, for example the steps of: casting a housing, wherein the step of casting further comprises at least one of casting the housing with a recess or aperture sized to accommodate the sensor, and machining a recess or aperture into the housing; positioning a sensor in the recess or aperture within 500 um of the exterior surface; routing sensor traces away from the sensor and toward the integrated circuit; and positioning the integrated circuit within the housing. In some methods, the electronic device has a display screen interface, such as where the display screen interface is one of the surfaces of the housing. In other methods, the electronic device comprises a touch screen sensor; presents a visual display; and/or has the fingerprint sensor region is incorporated into the display screen interface. In other methods, the method further includes the step of adhering a cover lens to at least a portion of the exterior surface. Additionally, the electronic device can be manufactured to provide for one or more button interfaces. Additional manufacturing steps can include, inserting or molding a support material within the recess of the fingerprint sensor region; forming a bezel suitable to engage, for example, a display interface; forming a tactile indicator of the location of the fingerprint sensing elements on the external surface; and/or applying a second layer to the exterior of the housing, wherein the second layer increases one or more of hardness, smoothness, fingerprint resistance, and smudge resistance.

INCORPORATION BY REFERENCE

All publications, patents, and patent applications mentioned in this specification are herein incorporated by reference to the same extent as if each individual publication, patent, or patent application was specifically and individually indicated to be incorporated by reference. An example of a disclosure of a mobile phone is included in, for example, U.S. Pat. No. 6,980,825 B1 issued Dec. 27, 2005 to Andersen et al.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

I. Devices

Biometric sensors can include, for example, one-dimensional (1D) and/or two-dimensional (2D) fingerprint sensors, a location sensor, a velocity sensor, and an integrated circuit (IC) which is electrically connected to the fingerprint sensor and the velocity sensor. Conductive traces of an image sensor and velocity sensor can be etched, patterned, printed, or otherwise formed on an upper side of a substrate. A protective coating can be applied to the upper surface of the substrate to provide electrical isolation and mechanical protection of the sensors. Alternatively, for example, conductive traces of an image sensor can be formed on a bottom-side of a substrate, wherein the substrate can also act as a protective coating and can be further improved with an additional coating, such as a hard coating, or smudge resistance coating, applied to the upper surface. Further details about fingerprint sensor configurations are contained in, for example, U.S. Pat. No. 7,751,601 B2 to Benkley III for "Fingerprint Sensing Assemblies and Methods of Making"; U.S. Pat. No. 7,099,496 B2 to Benkley III for "Swiped Aperture Capacitive Fingerprint Sensing Systems and Methods;" U.S. Pat. No. 7,463,756 B2 to Benkley III for "Finger Position Sensing Methods and Apparatus;" U.S. Pat. No. 7,460,697 B2 to Erhart et al. for "Electronic Fingerprint Sensor with Differential Noise Cancellation;" U.S. Pat. No. 7,146,024 B2 to Benkley III for "Swiped Aperture Capacitive Fingerprint Sensing Systems and Methods;" U.S. Pat. No. 6,400,836 B2 to Senior for "Combined Fingerprint Acquisition and Control Device;" and U.S. Pat. No. 6,941,001 B1 to Bolle for "Combined Fingerprint Acquisition and Control Device."

In the systems and devices disclosed herein, a sensor 140, such as fingerprint or stylus sensing device, location sensing device, movement speed sensing device, is integrated with a display or housing of an electronic device and is positioned on or adjacent an exterior surface of the display or housing such that the fingerprint sensor is within about 500 microns of a finger or stylus (or other suitable sensible element or element that it is desired to sense) when the finger or stylus comes in contact with a surface of the system (e.g., housing surface or screen surface), more particularly within 500 microns, even more particularly within 150 microns, still more particularly within 100 microns, and even more particularly within 50 microns. In at least some configurations, the system is configurable such that the sensor 140 is within about 200 microns of an element to be sensed, or more preferably within 100 microns of an element to be sensed, when the element comes in contact with the exterior surface of the system proximate to the sensor. In some configurations, a single chip can be provided that controls one or more of the display, the touch screen, and the sensing functions. Additionally, the sensor 140 can be incorporated in such a way that the surface of the electronic device presented to a user proximate to the sensor is smooth or substantially smooth. Alternatively, the surface of the device presented to a user proximate to the sensor can be convex or concave to facilitate tactile identification of the position of the sensor by the user.

Displays, housings, casings and systems can be configured or assembled such that they are integrally formed such that they act in a unified manner or such that the completed display, housings, casings or systems are comprised of a single component.

Figure 1A:
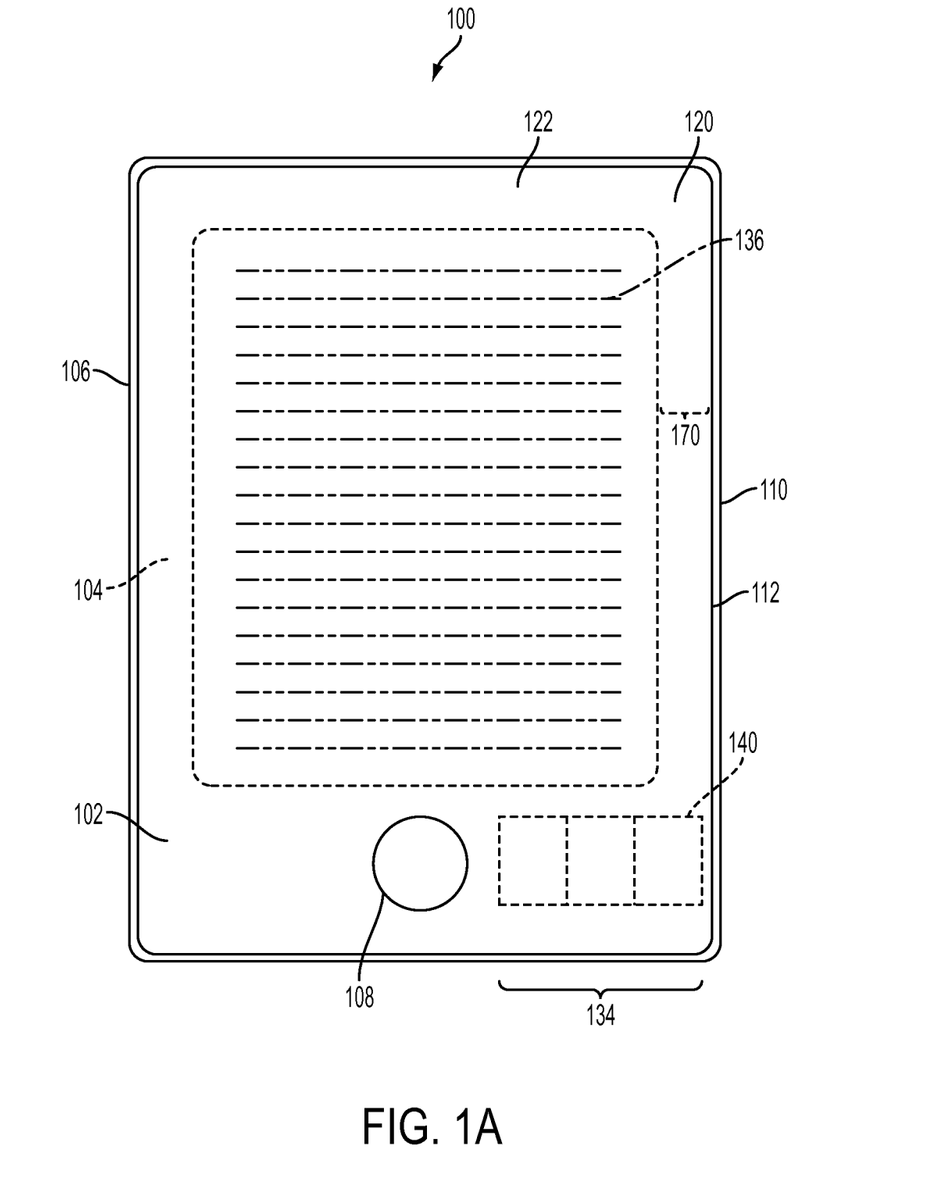
FIGS. 1A-C illustrate suitable electronic device form factors.
Figure 1B:
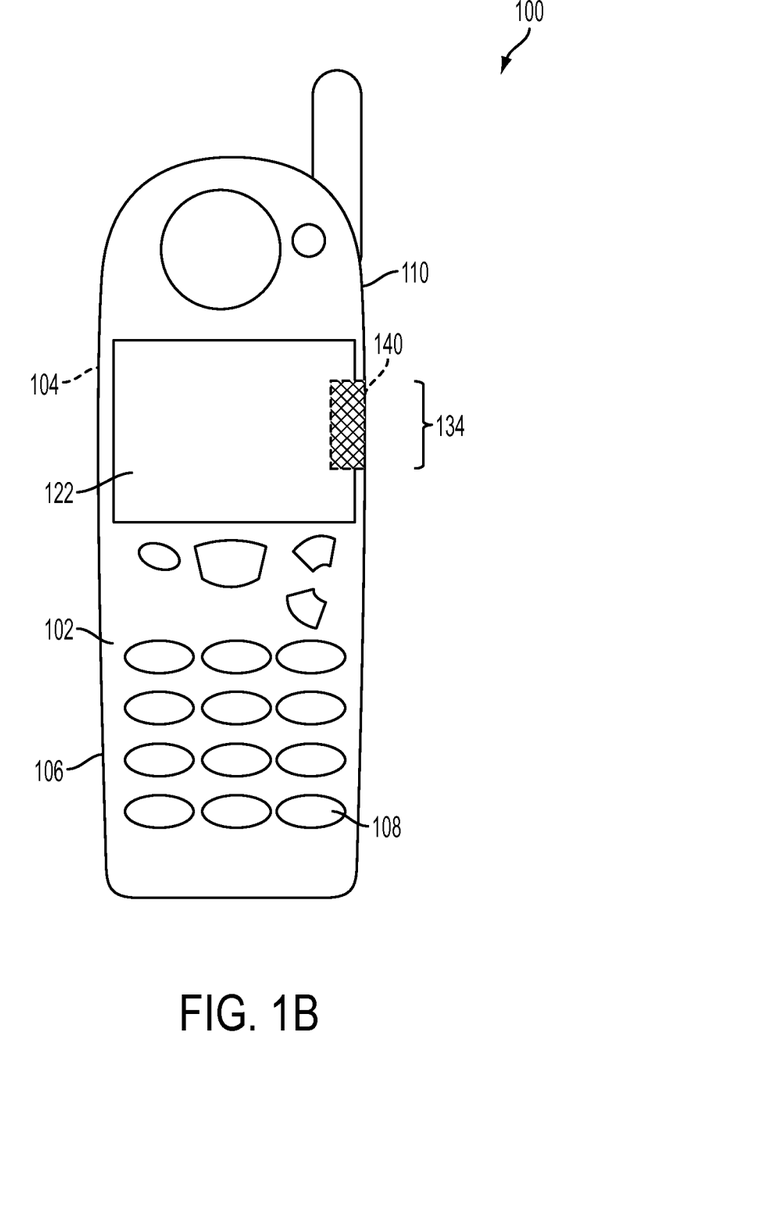
Figure 1C:
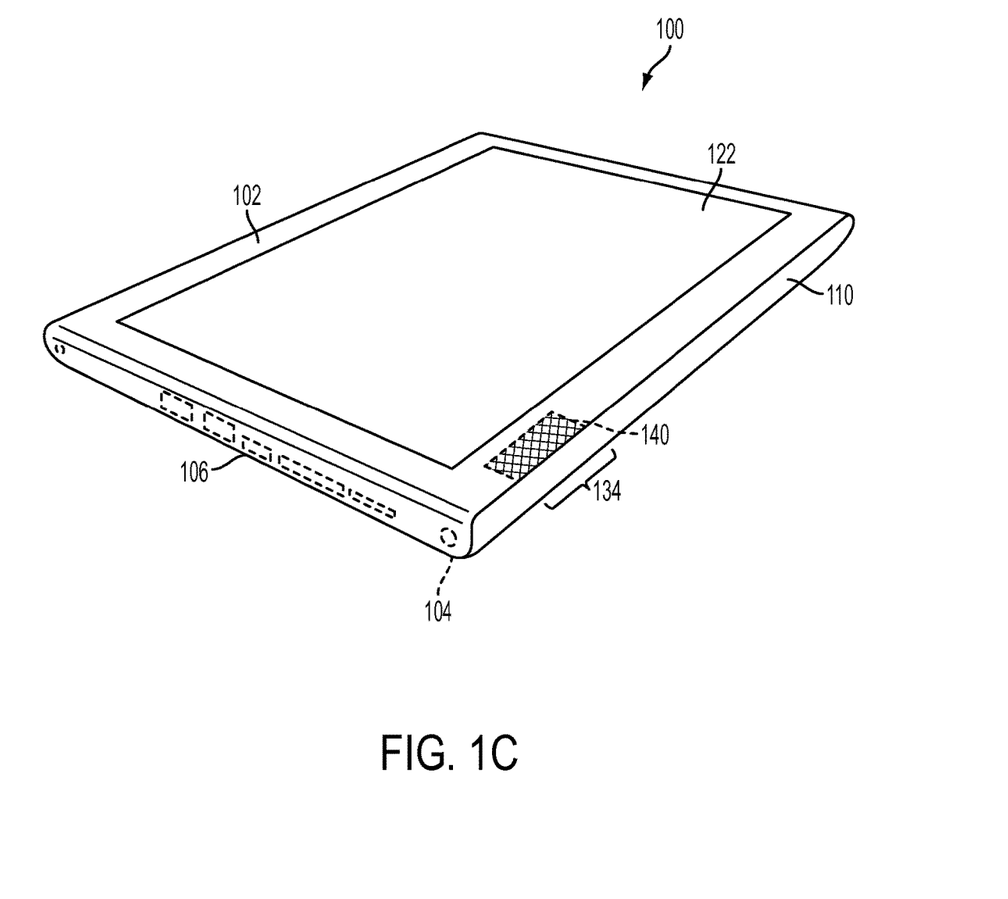

FIGS. 1A-C illustrate suitable electronic device form factors which are adaptable to include the sensors disclosed herein.

FIG. 1A is an electronic device 100 from a top or upper surface view of the housing 110. The device 100 is any suitable electronic device, such as a smart phone, having a device or display interface 120 which a user engages with their finger. Depending upon the nature of the device and display used, the display interface 120 can further be comprised of a plurality of parts, as discussed in further detail below.

When constructed, the electronic device 100 itself has a top surface 102 a bottom surface 104 and side surfaces 106. Moreover, as will be appreciated by those skilled in the art, components of the device can also have an upper surface (i.e. a surface that faces the top surface of the device) and a lower surface (i.e. a surface that faces the bottom surface of the device). As shown in FIG. 1A, the housing 110 of the electronic device 100 can be configured to form a bezel or rim 112 which secures an interface 120 (such as a touch/display screen or cover lens) within the housing 110 of the device 100. A mask 170, such as an ink mask, can be provided which frames at least part of the interface 120. Additionally, a cover lens 122 can be provided that presents an external surface of the interface 120. The mask 170 is typically positioned such that it obscures device electronics located within the housing under a portion of the interface 120. For a touch screen enabled interface, a portion of the interface 120 that is not covered by mask 170 has a plurality of touch screen sensors 136. The plurality of touch screen sensors 136 can be any suitable conductor, including a transparent conductor, for example, from a layer of patterned indium tin oxide (ITO), carbon nanotubes, metal nanowires, conductive polymers or fine metal lines (e.g., copper lines). Additionally, a fingerprint sensor 140 adjacent at least one wall of the electronic device 100 and can (as illustrated here), but need not, be positioned in a location where the mask 170 is also present. In another configuration, an aperture can be provided in the mask corresponding to all or part of a location where the fingerprint is sensed. The fingerprint sensor 140 can include a fingerprint swiping or fingerprint placement area 134 which is a fingerprint receiving area where, for example, a user would swipe or place their finger which is then read by the fingerprint sensor 140 in either one dimension (1D) or two dimensions (2D).

FIG. 1B is illustrates another form factor for an electronic device 100 suitable for use in implementing the disclosure.

The housing 110 has an upper surface 102, a lower surface 104, and side surfaces 106. One or more buttons 108, can be provided for the user to use in controlling device operation. The fingerprint sensor 140 is positioned in a fingerprint receiving/placement location 134. Additionally, a cover lens 122 can be provided FIG. 1C illustrates yet another form factor for an electronic device 100 suitable for use in implementing the disclosure. As noted, each of the devices 100 of FIGS. 1A-C has a housing 110 with an upper surface 102 (e.g., a surface with a user interface or display interface 120 and/or one or more buttons), a lower surface 104 opposite the upper surface, and side surfaces 106 between the upper surface and the lower surface. Buttons can be on the upper surface 102, the lower surface 104, and/or the side surfaces 106, or combinations thereof. The fingerprint sensor 140 is positioned in a fingerprint receiving/placement location 134.

Figure 2A:
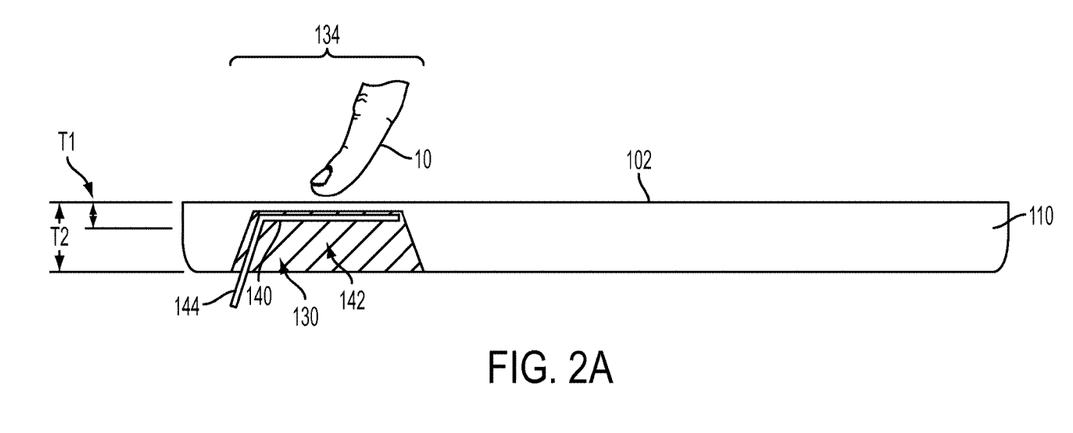
FIGS. 2A-B illustrate a cross-section of a portion of a housing of an electronic device having a recess therein.
Figure 2B:
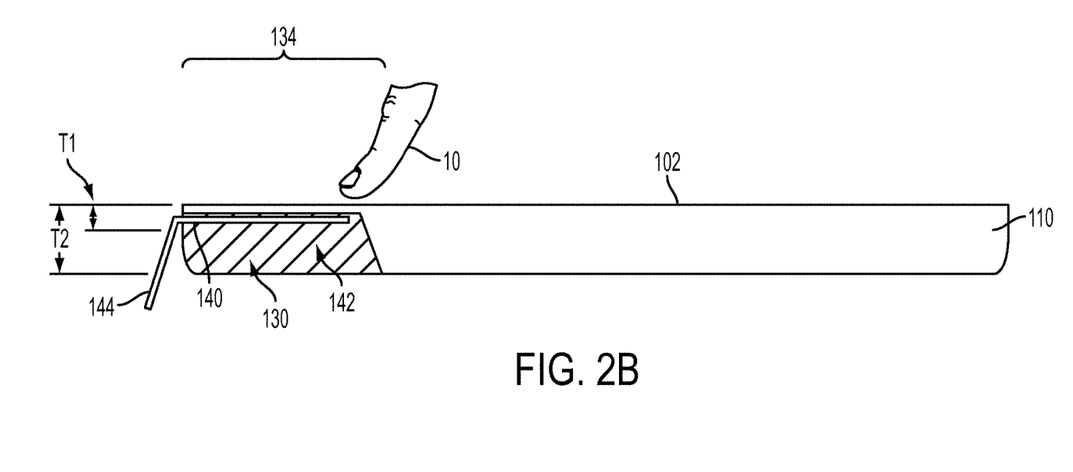

FIGS. 2A-B illustrates a cross-sectional view of a portion of a housing 110 of an electronic device such as a mobile telephone (e.g., described in U.S. Pat. No. 6,890,825) at location along a length of the housing (FIG. 2A) and at a location at an edge of a portion of the housing prior to final construction (FIG. 2B) wherein the housing 110 is adapted and configured to incorporate a biometric sensor 140, such as a fingerprint sensor or image sensor, associated with a finger interface or fingerprint receiving location 134 near an exterior surface, such as top surface 102 of the housing 110 of the electronic device. The thickness of the housing t2 generally is greater than the thickness t1 at the fingerprint receiving location 134.

The sensor 140 is at a first end of a flexible lead 144 which is in communicated with an integrated circuit (IC), not shown. As will be appreciated by those skilled in the art, the IC can be positioned on the flexible lead 144 such that it is located within the housing 110 of the device, or such that it fits within the recess 130.

This housing 110 is adapted and configured to provide mechanical protection of, for example, the fingerprint sensor and any other components of the electronic device beneath it. The housing 110 can be formed from any suitable material hard plastic, thermoplastic polymer (polycarbonate), polymethylmethacrylate (PMMA or acrylic), or polyester (polyethylene terephthalate (PET)).

In the assembly of the device, the fingerprint sensor 140 will be positioned such that the conductive elements of the fingerprint sensor 140 will be within the distance of an outer surface of the housing 110 which facilitates desired operational performance of a user's finger 10 when engaging the fingerprint sensor 140 during operation. To maintain the required structural integrity of the housing 110, the sensor region 130 (e.g., recess, alcove, depression, aperture, gap, opening, space) where the fingerprint sensor 140 is positioned internally can be filled with a first material of similar characteristics such that the nominal thickness overall of the filled region will be similar to the rest of the housing 110 or display interface 120 and forms a support structure 142 for the sensor 140. A second material, different than the first material, can be added if desired. Additionally, the sensor recess can be positioned or molded in the housing at a location which facilitates use of the sensor by the user when the device is completely assembled (e.g., on a side surface of the assembled device, on a bottom surface of the assembled device, or on a top surface of the assembled device).

As would be appreciated by those skilled in the art, in at least some configurations, the housing 110 could comprise a cover lens that is located on the front surface 102 of the device 100. Thus, for example, a construction as depicted in FIG. 2 is adaptable and configurable for use as a device cover lens that is at least partially transparent or comprises an area that is partially transparent.

In some configurations, the sensor region 130 can be configured to present a slight depression in the exterior surface of the housing or cover lens to provide a tactile indication of the position of the fingerprint sensor. In the assembly of the device, the fingerprint sensor 140 will be placed at this location such that the conductive elements will be within the distance of the outer surface that facilitates desired operational performance. To maintain the required structural integrity of the cover lens, the region can be filled with a material of similar characteristics such that the nominal thickness overall of the filled region will be similar to the rest of the cover lens. The fill material can form a plug or substrate providing mechanical support to the sensing region (finger interface) of the sensor.

Figure 3A:
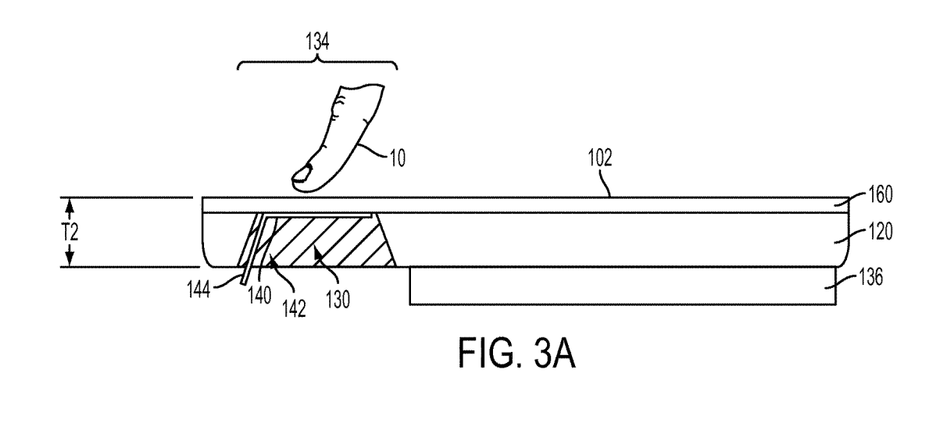
FIGS. 3A-B illustrate a cover lens associated with an electronic device having a recess therein in communication with a touch sensor covered by a thin layer of glass.
Figure 3B:
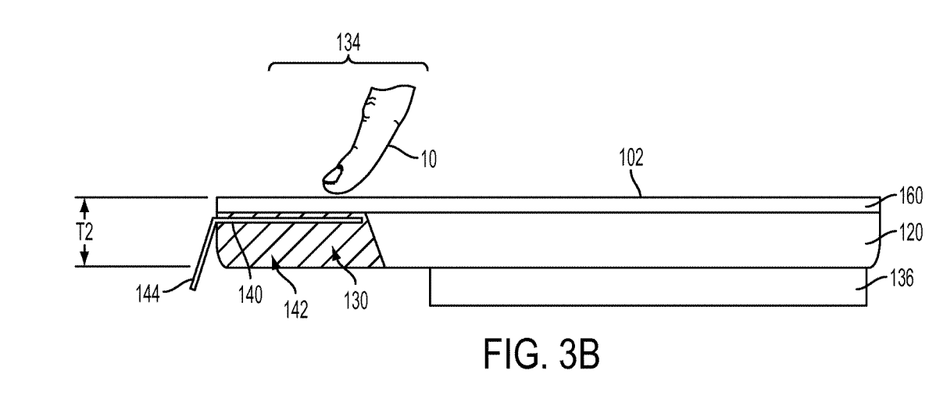

In some aspects of this disclosure, the sensor region 130 is formed from a hole or aperture that passes through the entire housing 110 or display interface 120 at fingerprint receiving location or interface 134 (see, e.g., FIGS. 3A-B) at location along a length of the housing or cover lens (FIG. 3A) or a location at an edge of the housing or display interface (FIG. 3B). The sensor region 130 can be created and an outer layer 160 (e.g. a thin glass sheet as illustrated in FIG. 3) can be positioned above (outwardly) the region to create a smooth, undisturbed outer surface for a user when engaging the fingerprint sensor.

In the assembly of the device, the fingerprint sensor 140 will be positioned such that the conductive elements of the fingerprint sensor 140 will be within the distance of an outer surface of the housing 110 which facilitates desired operational performance of a user's finger 10 when engaging the fingerprint sensor 140 during operation. To maintain the required structural integrity of the housing 110 or display interface 120, the sensor region 130 (e.g., recess, alcove, depression, aperture, gap, opening, space) where the fingerprint sensor 140 is positioned internally can be filled with a first material of similar characteristics such that the nominal thickness overall of the filled region will be similar to the rest of the housing 110 or display interface 120 and forms a support structure 142 for the sensor 140. A second material, different than the first material, can be added if desired. Additionally, as discussed above, the sensor region 130 can be positioned or molded in the housing at a location which facilitates use of the sensor by the user when the device is completely assembled (e.g., on a side surface of the assembled device, on a bottom surface of the assembled device, or on a top surface of the assembled device).

In some configurations, the sensor region 130 can be configured to present a slight depression in the exterior surface of the housing or cover lens to provide a tactile indication of the position of the fingerprint sensor. In the assembly of the device, the fingerprint sensor 140 will be placed at this location such that the conductive elements will be within the distance of the outer surface that facilitates desired operational performance. To maintain the required structural integrity of the cover lens, the region can be filled with a material of similar characteristics such that the nominal thickness overall of the filled region will be similar to the rest of the cover lens.

As will be appreciated by those skilled in the art, the display interface 120 may have other coatings or layers between it and the outer surface of the device which houses a cover lens 122 which are provided to improve functional performance. For structural support and to protect the device, the nominal thickness of this cover lens is typically greater than 0.5 mm, depending on the device design. The shape of the cover lens is formed in a casting or molding process. Additional coatings can also be included, such as an anti-smudge coating.

Figure 4A:
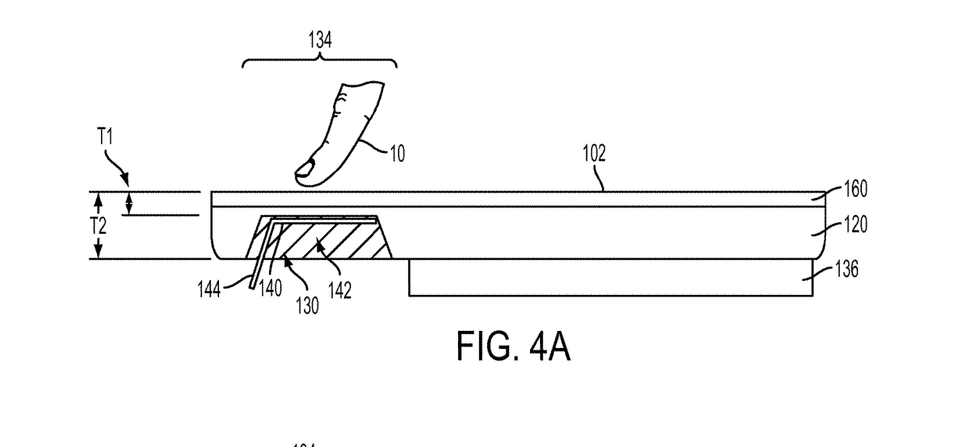
FIGS. 4A-B illustrate a cover lens associated with an electronic device having multiple layers and a recess therein in communication with a touch sensor.
Figure 4B:
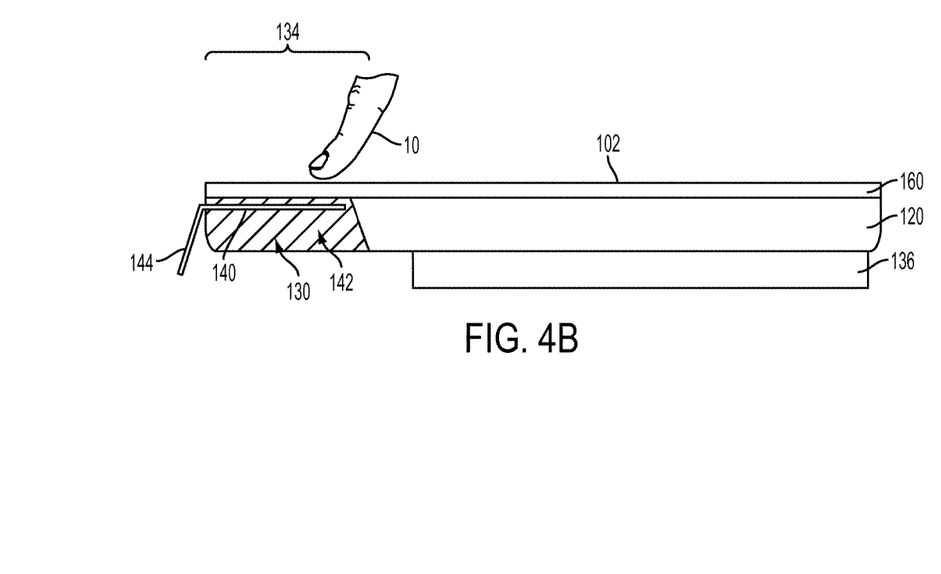
Figure 5:
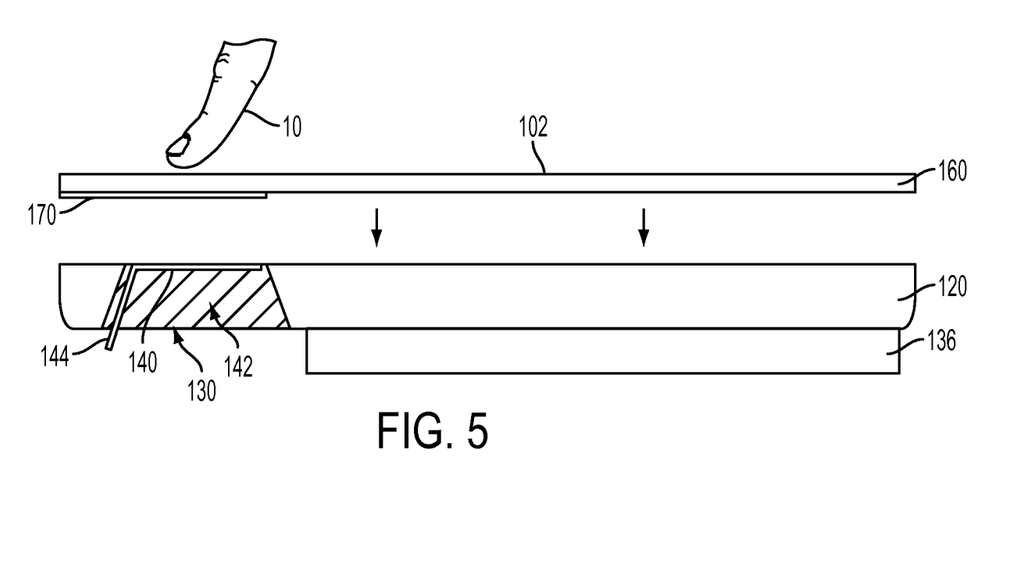
FIG. 5 illustrates a cover lens associated with an electronic device having a recess therein in communication with a touch sensor with a thin layer of glass having an ink mask during the process of placing the cover lens over the display interface.

In this configuration, the shape of the display interface 120 is adaptable to incorporate a location (such as a region 130) where at least a portion of the fingerprint sensor 140 can be incorporated. However, as will be appreciated by those skilled in the art, the recess and sensor 140 can be positioned elsewhere on the electronic device without departing from the scope of the disclosure. As illustrated, in this location, the thickness t1 is less than the thickness t2 and t1 is a thickness that is the same or greater than distance between the fingerprint sensor 140 and a fingertip 10 required to achieve sensor operation. As mentioned above, this distance between the fingertip 10 and the sensor 140 may be 500 microns or less, more specifically 150 microns or less, and even more specifically 100 microns or less. The shape of the display interface 120 can be any suitable shape (e.g., square, rectangular, oval, round, triangular, octagonal, etc.) desired in the overall device design and typically is configurable to preserve a smooth, undisturbed outer surface desired in a touch screen. Moreover, shapes normally featuring sharp edges (e.g., square, rectangular, triangle), can have the edges rounded. The length and width of the fingerprint sensor region 130 will be of a size sufficient to house at least the sensor portion of the fingerprint sensor. Additionally, the aperture or recess can be positioned such that it is surrounded on all sides by the housing 110 or the display interface 120 (as shown in FIGS. 3A, 4A and 5) or such that it is on an end or edge of housing 110 or the display interface 120 (as shown in FIGS. 3B, and 4B). The walls of the aperture or recess can be perpendicular to the upper surface of the housing 110 or display interface 120, or at an angle (as illustrated).

To maintain the required structural integrity of the cover lens 122, the region 130 (e.g., recess, alcove, depression, aperture, gap, opening, space) can be filled with another material 140 of similar characteristics such that the nominal thickness overall of the filled region will be similar to the rest of the cover lens 122.

The fingerprint sensor 140 is incorporatable in the cover lens 122 of a touch sensor device. The sensor could be positioned either directly above or to the side of the active area of the touch sensor, and be either visible, hidden behind an ink mask or other feature, or transparent. The sensor, such as a fingerprint sensor, can be incorporated into any surface that is supported by hard plastic where it is desired to image fingerprints, or create any other images capacitively.

The shape of the cover lens 122 is adaptable to include a location where the fingerprint sensor is incorporatable. In the fingerprint sensor receiving location, the thickness of the plastic combined with any additional layers will be the same or less than the distance required between the fingerprint sensor and a fingertip for sensor operation. As mentioned above, this distance may be 500 microns or less, more specifically 200 microns or less, and even more specifically 100 microns or less. The shape of the cover lens 122 can be configured to preserve the smooth, undisturbed outer surface desired in a touch screen and often desired in other device surfaces FIGS. 4A-B illustrate the use of a cover glass in conjunction with a cover lens 122 that has a fingerprint receiving location 134 that forms a recess to house the fingerprint sensor 140 but which does not form an aperture.

The fingerprint sensor 140 is incorporatable in the cover lens 122 of a touch sensor device using any of the disclosed configurations. The fingerprint sensor 140 could be either directly above or to the side of the active area of the touch sensor, and be either visible, hidden behind an ink mask 170 (see, e.g. FIG. 5) or other feature, or be transparent.

II. Methods of Use

An electronic device 100 configurable to position a fingerprint sensor 140 within sensing region of a finger 10 of an operator or user, such as by providing a moldable cover lens 122, is deployed by a user. The user applies and/or swipes his or her finger 10, or applies the stylus or element to be sensed, to a surface of the device in a position in communication with the sensor positioned in the aperture or recess. For example, the element to be sensed (such as a finger) can be applied (e.g., by swiping across the surface) to the housing 110 or moldable cover lens 122 in a position that is in communication with the recess or aperture containing the sensing element. Thus, the fingerprint is sensed by the fingerprint sensor and/or biometric input is received. The sensed input (such as a fingerprint) is validated. Once validated, use of the electronic device 100 is permitted or other functionality controlled by the fingerprint authentication is permitted. In another operation of use, the user applies and/or swipes his or her finger 10 within a depression in the housing on the surface of the device in a position in communication with the sensor positioned in the aperture or recess.

As will be appreciated by those skilled in the art, the sensors 140 disclosed can be used in a variety of ways including, for example:
   User authentication for device (e.g., phone, tablet, or computer) unlocking
   User authentication for online transactions
   User authentication for access to device systems and services, including websites and email
   Replacement of Password and PINs
   Physical access such as door locks
   Time and attendance systems (prove you were at a certain place at a certain time)
   Finger-based input devices/navigation for mobile phones and gaming
   Finger-based shortcuts (authentication of a given finger results in the corresponding action to which that finger is mapped)
   Non-repudiation for online transactions

III. Methods of Manufacture

A suitable material, such as those described above, is selected for molding into a shape having an exterior shape suitable to form an electronic device 100 form factor. The mold can be formed to either include a recess or aperture or a recess or aperture can be formed in a cover lens 122. A fingerprint sensor can then be positioned such that the sensing portion of the sensor fits within the recess or aperture and a flex circuit connected to the sensor extends outside the recess or aperture such that electrical connection to the sensor can be achieved. The fingerprint sensor is positionable within 500 microns of a finger. In some configurations, it is possible to connect the sensor to a chip either by connection to this flex circuit or by mounting the chip directly onto the flex. The chip can, for example, be mounted in the electronic device 100 housing 110. The electronic device 100 is then assembled using ordinary techniques known in the art.

In an exemplar process of manufacturing, the process can be summarized as follows:
   (a) Housing is cast
      a. In one implementation, the housing is cast with a recess or aperture to accommodate sensor
      b. In another implementation, or a recess is machined into the housing.
      c. The recess is configurable to protrude all the way through, or leave a layer of material on the exterior (tactile) side.
   (b) A second layer may be applied to the exterior side of the housing (tactile side) so as to add a property to the exterior such as hardness, smoothness, fingerprint resistance, smudge resistance, etc.
   (c) A sensor is placed or bonded into within the recess in proximity to the exterior (tactile) surface, close enough to sense a finger on this surface (500 um or less) and with electric traces (e.g. flex) routing away from the sensor toward the integrated circuit.
   (d) The integrated circuit is positioned within the recess, under the sensor, or positioned within the housing.

In another exemplar process of manufacturing, the process can be summarized as follows:
   (a) A cover lens is formed for integration into a device housing
      a. In one implementation, the cover lens is formed with a recess or aperture to accommodate sensor
      b. In another implementation, or a recess is machined into the cover lens.
      c. The recess is configurable to protrude all the way through, or leave a layer of material on the exterior (tactile) side.
   (b) A second layer may be applied to the exterior side of the cover lens (tactile side) so as to add a property to the exterior such as hardness, smoothness, fingerprint resistance, smudge resistance, etc.
   (c) A sensor is placed or bonded into within the recess in proximity to the exterior (tactile) surface, close enough to sense a finger on this surface (500 um or less) and with electric traces (e.g. flex) routing away from the sensor toward the integrated circuit.
   (d) The integrated circuit is positioned within the recess, under the sensor, or positioned within the housing.

The recess is finable with material (epoxy, plastic, resin) and is curable (UV, thermal, air exposure) to achieve mechanical properties similar to the housing material While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:
1. An electronic device housing comprising:
   a display screen cover lens having an upper surface, a lower surface and side surfaces between the upper surface and the lower surface such that the upper, lower and side surfaces integrally form the display screen cover lens;
a fingerprint sensor;
a recess, configured to receive the fingerprint sensor therein and integrally formed within a first exterior surface of the display screen cover lens, wherein a sensing portion of the fingerprint sensor is positioned within the recess at a location within 500 microns of a second exterior surface of the display screen cover lens;
a display screen positioned beneath the lower surface of the display screen cover lens; and
a plurality of touchscreen sensors beneath the lower surface of the display screen cover lens.

2. The electronic device housing according to claim 1 wherein the display screen covers a first portion of the lower surface of the display screen cover lens.

3. The electronic device housing according to claim 2 wherein the fingerprint sensor covers a second portion of the lower surface of the display screen cover lens.

4. The electronic device housing according to claim 1 wherein the cover lens comprises a glass layer.

5. The electronic device housing according to claim 1 wherein the fingerprint sensor attached to a flexible lead.

6. The electronic device housing according to claim 1 wherein the cover lens is a top surface of the electronic device housing.

7. The electronic device housing according to claim 1 wherein the electronic device housing has one or more button interfaces.

8. The electronic device housing according to claim 1 wherein the electronic device housing further comprises a bezel.

9. The electronic device housing according to claim 1 wherein the display screen cover lens has a concave exterior feature adapted to provide a tactile indication of the location of the fingerprint sensor.

10. The electronic device housing according to claim 1 wherein the recess is molded into the display screen cover lens.

11. The electronic device housing according to claim 1 wherein the fingerprint sensor is positioned within the recess from an interior surface of the electronic device housing.

12. An electronic device housing comprising:
a display screen cover lens having an upper surface, a lower surface and side surfaces between the upper surface and the lower surface such that the upper, lower and side surfaces integrally form the display screen cover lens;
a fingerprint sensor;
a recess, configured to receive a finger therein and integrally formed within a first exterior surface of the display screen cover lens, wherein a sensing portion of the fingerprint sensor is positioned on a second exterior surface and within 500 microns of the recess;
a display screen positioned beneath the lower surface of the display screen cover lens; and
a plurality of touchscreen sensors beneath the lower surface of the display screen cover lens.

13. The electronic device housing according to claim 12 wherein the cover lens comprises a glass layer.

14. The electronic device housing according to claim 12 wherein the cover lens is a top surface of the electronic device housing.

15. The electronic device housing according to claim 12 wherein the display screen covers a first portion of the lower surface of the display screen cover lens.

16. The electronic device housing according to claim 15 wherein the fingerprint sensor covers a second portion of the lower surface of the display screen cover lens.

17. The electronic device housing according to claim 12 wherein the fingerprint sensor is attached to a flexible lead.

18. The electronic device housing according to claim 12 wherein the electronic device housing has one or more button interfaces.

19. The electronic device housing according to claim 12 wherein the electronic device housing further comprises a bezel.

20. The electronic device housing according to claim 12 wherein the recess has a concave exterior feature adapted to provide a tactile indication of the location of the fingerprint sensor.

21. The electronic device housing according to claim 12 wherein the recess is molded into the display screen cover lens.

22. The electronic device housing according to claim 12 wherein the fingerprint sensor is positioned opposite the recess from an interior surface of the electronic device housing.

23. An electronic device housing comprising:
a display screen cover lens having an upper surface, a lower surface and side surfaces between the upper surface and the lower surface such that the upper, lower and side surfaces integrally form the display screen cover lens;
a fingerprint sensor;
a recess integrally formed within an exterior surface of the display screen cover lens, wherein a sensing portion of the fingerprint sensor is positioned in a first exterior surface of the display screen cover lens and within 500 microns of a second exterior surface of the display screen cover lens;
a display screen positioned beneath the lower surface of the display screen cover lens; and
a plurality of touchscreen sensors beneath the lower surface of the display screen cover lens.

24. The electronic device housing according to claim 23 wherein the recess is in the first exterior surface of the display screen cover lens and the fingerprint sensor is positioned within the recess.

25. The electronic device housing according to claim 23 wherein the recess is in the second exterior surface of the display screen cover lens and is configured to receive a finger therein.

26. The electronic device housing according to claim 25 wherein a sensing portion of the fingerprint sensor is positioned on the first exterior surface within 500 microns of the recess.

27. The electronic device housing according to claim 23 wherein the display screen covers a first portion of the lower surface of the display screen cover lens.

28. The electronic device housing according to claim 27 wherein the fingerprint sensor covers a second portion of the lower surface of the display screen cover lens.

* * * * *